United States Patent [19]

Johnson et al.

[11] Patent Number: 5,758,049
[45] Date of Patent: May 26, 1998

[54] METHOD OF AND APPARATUS FOR PROVIDING AUTOMATIC DETECTION AND PROCESSING OF AN EMPTY MULTIMEDIA DATA OBJECT

[75] Inventors: William J. Johnson, Flower Mound; Robert S. Keller, Grapevine; George C. Manthuruthil, Coppell; Marvin L. Williams, Lewisville, all of Tex.

[73] Assignee: International Business Machines Corporation, Armonk, N.Y.

[21] Appl. No.: 877,638

[22] Filed: May 1, 1992

[51] Int. Cl.[6] .................................................. G06F 11/30
[52] U.S. Cl. .................................................. 395/154
[58] Field of Search .................... 395/154, 145, 395/147, 117, 161

[56] References Cited

U.S. PATENT DOCUMENTS

| | | |
|---|---|---|
| 4,460,269 | 7/1984 | Yamazaki et al. |
| 4,763,162 | 8/1988 | Yagasaki. |
| 4,811,115 | 3/1989 | Lin et al. ............... 358/283 |
| 4,931,950 | 6/1990 | Isle et al. ............... 395/154 X |
| 5,148,154 | 9/1992 | MacKay et al. ......... 395/154 X |
| 5,185,854 | 2/1993 | Yoshida et al. ......... 395/145 X |
| 5,230,041 | 7/1993 | Dinwiddie et al. ...... 395/154 X |

FOREIGN PATENT DOCUMENTS

| | | |
|---|---|---|
| 222238 | 9/1987 | Japan. |
| 1123567 | 5/1989 | Japan. |

OTHER PUBLICATIONS

Fullwrite Professional (Trademark of Ashton–Tate Cor.). 1990. pp. 1–4.
Microsoft Visual Basis (Trademark of Microsoft Corporation). 1991, pp. 34–41, 57–65.
Microsoft Windows 3.1 (Trademark of Microsoft Corporation). 1992, Screen Display #1.
R. Steinmetz "Synchronization Properties in Multimedia Systems" IBM Deutschland GMBH Technical Report No. 43.8906 Published May, 1989 at Heidelberg, Federal Republic of Germany.

(List continued on next page.)

*Primary Examiner*—Mark K. Zimmerman
*Assistant Examiner*—Cliff N. Vo
*Attorney, Agent, or Firm*—Edward H. Duffield; Andrew J. Dillon

[57] ABSTRACT

Automatic detection and processing of an empty multimedia data object is used to determine the data type of a multimedia data object. The system also detects whether the multimedia data object, or a component thereof, is empty based upon its data type. The system also appropriately processes a detected empty multimedia data object, or a component thereof. The appropriate processing may include no action, informing a user, program, or device of a detected empty multimedia data object, or a component thereof, inhibiting further processing of a detected empty multimedia data object, or a component thereof, or deleting a detected empty multimedia data object, or a component thereof.

51 Claims, 9 Drawing Sheets

OTHER PUBLICATIONS

D. J. Daley, E. C. Grazier, D. R. Hatzenbihler, & T. R. Schwalen "Using a Facsimile Machine As a System Printer" IBM Technical Disclosure Bulletin, vol. 33, No. 10A, pp. 71–74 Published Mar., 1991 at Armonk, N.Y.

D. J. Daley, E. C. Grazier, D. R. Hatzenbihler, & T. R. Schwalen "Using a Remote Facsimile Machine As a System Scanner" IBM Technical Disclosure Bulletin, vol. 33, No. 10A, pp. 65–66 Published Mar., 1991 at Armonk, N.Y.

M. Marefat, I. D. Shakib, & J. M. Sublette "Smart Feed Feature With Page-Wide R2T2 Ribbon" IBM Technical Disclosure Bulletin, vol. 33, No. 4, pp. 46–47 Published Sep., 1990 at Armonk, N.Y.

W. L. Banning, & R. A. Feigel "Suppressing Trailing Blank Print Forms" Research Disclosure, No. 297 Published Jan., 1989 in England.

H. M. Beebe, & L. Richards "Detection of Multi-Paper Pages" IBM Technical Disclosure Bulletin, vol. 26, No. 10A, pp. 5171–5172 Published Mar., 1984 at Armonk, N.Y.

J. F. Fedak, & R. W. Foreman "Head and Paper Motion Optimization for Increase Throughput on an Advanced Function Ink Jet Printer" IBM Technical Disclosure Bulletin, vol. 25, No. 5, pp. 2479–2481 Published Oct., 1982 at Armonk, N.Y.

Masunaga, Y. 'Design Issues of Omega: An Object–Oriented Multimedia Database Management System' Journal of Information Processing (Japan), vol. 14, No. 1, 1991, pp. 60–74.

Sugawa, H. 'Image Reader for Character Processing System' Database WPI, Week 8925, Derwent Publications Ltd., London, GB; AN 89–183840.

Kovacs, I. 'An ABC–80 oriented teletext coder' Database Inspec Institute of Electrical Engineers, Stevenage, GB, Inspec No. 2427726, *Abstract*, & Informacio Elektronika, vol. 19, No. 5, 1984, Hungary, pp. 295–298.

Josenhans, J. G., et al., 'Speech Processing Application Standards' AT & T Technical Journal, Sep.–Oct., vol. 65, No. 5, 1986, New York US, pp. 23–33.

Gan, C. K. & Donaldson, R. W. 'Speech Compression For Storage and Transmission Using Silence Deletion' IEEE International Conference on Communications '86 Cat. No. 86CH2314–3, vol. 2, 25 Jun. 1986, Toronto Ont. Canada, pp. 1310–1317.

1

METHOD OF AND APPARATUS FOR PROVIDING AUTOMATIC DETECTION AND PROCESSING OF AN EMPTY MULTIMEDIA DATA OBJECT

TECHNICAL FIELD OF THE INVENTION

This invention relates in general to multimedia data processing systems, and in particular to a method of, and apparatus for, providing automatic detection and processing of an empty multimedia data object.

BACKGROUND OF THE INVENTION

Conventional data processing systems may provide input capabilities for entering data objects into a system, processing capabilities for storing and manipulating data objects within the system, and output capabilities for displaying, printing, or communicating data objects from the system. Herein, data object also means a component of a data object. However, when a data object, or component of a data object, is empty, conventional data processing systems do not provide a comprehensive capability for detecting and appropriately processing an empty data object or empty component of a data object. Herein, empty means that a data object contains no useful information or that a data object contains a marker indicating that the data object is effectively empty. This is a problem in that an empty data object that contains no useful information is wasting valuable system resources when the empty data object is entered into, stored in, manipulated in, or outputted from a system. This is also a problem in that an empty data object may waste user time and effort. This is also a problem in that an empty data object may represent the inadvertent loss of valuable information.

The prior art has not recognized these problems. The prior art consists of incomplete fragmented solutions which do not recognize nor address the full scope of the problems. The state of the prior art is demonstrated by printer ribbon inhibitors, printer head inhibitors, EOJ (End of Job) separator page inhibitors, and copier duplex sheetfeed mechanisms.

Printer ribbon inhibitors detect blank characters in a line to be printed and deactivate the movement of a printer printer ribbon which normally moves after each character is printed. This deactivation allows the portion of the printer ribbon that was not used by a blank character to be used to print the next character. However, blank characters are still printed by the printer. If an entire line consists of only blank characters, the blank lines are still printed by the printer. If an entire page consists of only blank lines, then an entire blank page is still printed by the printer. If an entire document consists of only blank pages, then an entire blank document is still printed by the printer. Although a printer ribbon inhibitor allows full utilization of a printer ribbon, it does not detect empty data objects, nor does it prevent the waste of system resources consumed in printing a blank document. These wasted resources include the printer utilization time and the paper.

Printer head inhibitors detect blank lines in a document to be printed and deactivate the printer head during the printing of the blank line. This deactivation saves wear and tear on the printer head and extends its operational life. However, the blank lines are still printed by the printer. If an entire page consists of only blank lines, then an entire blank page is still printed by the printer. If an entire document consists of only blank pages, then an entire blank document is still printed by the printer. Although a printer head inhibitor saves wear and tear on a printer head, it does not detect empty data objects, nor does it prevent the waste of system resources consumed in printing a blank document. These wasted resources include the printer utilization time and the paper.

EOJ separator page inhibitors suppress the insertion and printing of EOJ separator pages between printer tasks by a printer spooler. Some printer spoolers automatically insert EOJ separator pages between sequential printer tasks printed by a batch printer. The printing of EOJ separator pages causes the end of the prior printer task to be ejected from a printer housing so that the prior printer task may be removed from the printer. Otherwise, one would have to wait until the printing of the next printer task caused the end of the prior printer task to be ejected. If the next printer task immediately follows the prior printer task, then the next printer task will eject the prior printer task, thus removing the need for EOJ separator pages between these two immediately sequential printer tasks. Hence, the need for EOJ separator page inhibitors to inhibit the printing of EOJ separator pages between immediately sequential batch printer tasks. However, the EOJ separator pages are not included in the original data objects to be printed. Furthermore, the EOJ separator pages are commonly not blank pages, but instead contain information identifying the next printer task. Therefore, EOJ separator page inhibitors do not either detect or process empty data objects.

Some copier duplex sheetfeed mechanisms detect the difference between double sided originals versus single sided originals so that a copier may determine whether to copy either both sides or just one side of the original. These sheetfeed mechanisms use a blank line sensor (an electronic white space detector) to determine if an entire side of an original is blank. In an original having a blank surface on one side only, the side having an image is processed without executing the image processing of white paper on the other side which does not have an image to be copied. Although these sheetfeed mechanisms may detect a blank original, they cannot detect empty data objects stored in electronic form, nor empty multimedia data objects. They also cannot inhibit output processing of blank originals. In addition, the blank line sensor is separate from and operates before any image processing of the original.

For a situation which may call for detection and processing of empty data objects, consider the following situations. Currently within a data processing system, an originator of a distribution may advertently or inadvertently send a empty data object, such as a document that has a multitude of blank pages. These pages may be of no interest to the recipient of the distribution. In particular, this problem occurs frequently in facsimile transmissions. The originator may wish to fax a bulk of documents without viewing the individual pages. Some pages may be blank, thus causing the originator's system to scan, store, manipulate, and transmit blank pages. This also causes the recipient's system to receive, store, manipulate, and perhaps print blank pages. The originator of a facsimile transmission may inadvertently place the documents "wrong side up" into the facsimile device, thus causing both the originator's system and the recipient's system to process entire documents that consist of blank pages. This problem may also occur for other image data objects. For example, a scanner may scan a document containing blank pages or an entire blank document. This problem is not limited to image data objects, it may also occur with text data objects, video data objects, audio data objects, or multimedia data objects. This problem may also occur during the input, output, or system processing of an empty data object.

The prior art approaches described above present the user with four difficulties. The first difficulty is that the prior art approaches generally do not detect empty data objects. They detect and respond to aspects of an empty data object, but they also detect and respond to those same aspects in data objects which are not empty. For example, although a printer ribbon inhibitor detects blank characters in a blank page, it also detects blank characters in a non-empty page consisting of both blank characters and non-blank characters. Although a printer head inhibitor detects blank lines in a blank page, it also detects blank lines in a non-empty page consisting of both blank lines and non-blank lines. Although a copier duplex sheetfeed mechanism may detect both blank sides of a blank original, it also detects the single blank side of a non-empty single sided original. The second difficulty is that not detecting empty data objects allows the system to further process these empty data objects. The third difficulty is that this processing wastes both valuable system resources and user resources, which may have been avoided if the empty data objects had been detected. The fourth difficulty is that not detecting empty data objects may allow a loss of valuable information to go undetected.

Thus the prior art provides no method of, or apparatus for, automatic detection and processing of an empty multimedia data objects. As such, there is a need for a method of, and apparatus for, providing automatic detection and processing of empty multimedia data objects.

SUMMARY OF THE INVENTION

The invention disclosed herein comprises a method of, and apparatus for, providing automatic detection and processing of empty multimedia data objects. Herein, a multimedia data object means a data object comprising one or more different types of data objects. These types may comprise text, graphics, image, video, audio, etc. The method and apparatus described herein substantially eliminate or reduce the difficulties encountered in conventional systems when empty data objects are not detected by providing automatic detection and processing of empty multimedia data objects.

In accordance with one aspect of the present invention, automatic detection and processing of an empty multimedia data object is provided.

Another aspect of this invention is that determination of the data type of an empty multimedia data object is provided.

Yet another aspect of this invention is that automatic detection of an empty multimedia data object based upon its data type is provided.

Yet another aspect of this invention is that specification of appropriate processing for a detected empty multimedia data object is provided.

Yet another aspect of this invention is that the specification of appropriate processing may include no action, informing a user, program, or device of a detected empty multimedia data object, inhibiting further processing of a detected empty multimedia data object, or deleting a detected empty multimedia data object.

The present invention has the advantage of allowing automatic detection of an empty multimedia data object.

The present invention has the further advantage of allowing a user, application program, operating system program, device driver, or device to be informed of an empty multimedia data object.

The present invention has the further advantage of allowing a user, application program, operating system program, device driver, or device to inhibit further processing of an empty multimedia data object.

The present invention has the further advantage of allowing a user, application program, operating system program, device driver, or device to initiate empty multimedia data object specific processing of an empty multimedia data object.

The present invention has the further advantage of allowing a user, application program, operating system program, device driver, or device to delete an empty multimedia data object.

The present invention has the further advantage of detecting an empty multimedia data object in the input, memory, storage, or output of a data processing system.

The present invention has the further advantage that it may be implemented as a system filter.

BRIEF DESCRIPTION OF THE DRAWINGS

For a more complete understanding of the present invention and the advantages thereof, reference is now made to the Detailed Description in conjunction with the attached Drawings, in which.

DETAILED DESCRIPTION OF THE INVENTION

Referring first to FIG. 1 through FIG. 8, flowcharts illustrating operations preferred in carrying out the present invention are shown. In the flowcharts, the graphical conventions of a diamond for a test or decision and a rectangle for a process or function are used. These conventions are well understood by those skilled in the art, and the flowcharts are sufficient to enable one of ordinary skill to write code in any suitable computer programming language.

The operations preferred in carrying out the present invention may be implemented as nine processes, programs, or routines comprising a Main Program, a Separator Routine, an Empty Filter Routine, an Empty Text Filter Routine, an Empty Non-Text Image Filter Routine, an Empty Text Image Filter Routine, an Empty Video Filter Routine, and an Empty Audio Filter Routine. The Main Program, illustrated in FIG. 1, determines a data type of a multimedia data object and directs appropriate processing of either a single type multimedia data object or a mixed type multimedia data object. The Separator Routine, illustrated in FIG. 2, separates a data object into components. For example, a text data object may be separated into pages, or a video data object may be separated into video frames. The Empty Filter Routine, illustrated in FIG. 3, either calls an appropriate type of data object filter or informs that the data object is not a supported data type. The Empty Text Filter Routine, illustrated in FIG. 4, determines if a text type data object, or a component thereof, such as a page, is empty. The Empty Non-Text Image Filter Routine, illustrated in FIG. 5, determines if a non-text image type data object, or a component thereof, such as a page, is empty. The Empty Text Image Filter Routine, illustrated in FIG. 6, determines if a text image type data object, or a component thereof, such as a page, is empty. The Empty Video Filter Routine, illustrated in FIG. 7, determines if a video type data object, or a component thereof, such as a video frame, is empty. The Empty Audio Filter Routine, illustrated in FIG. 8, determines if an audio type data object, or a component thereof, such as an audio packet, is empty.

Figure 1:
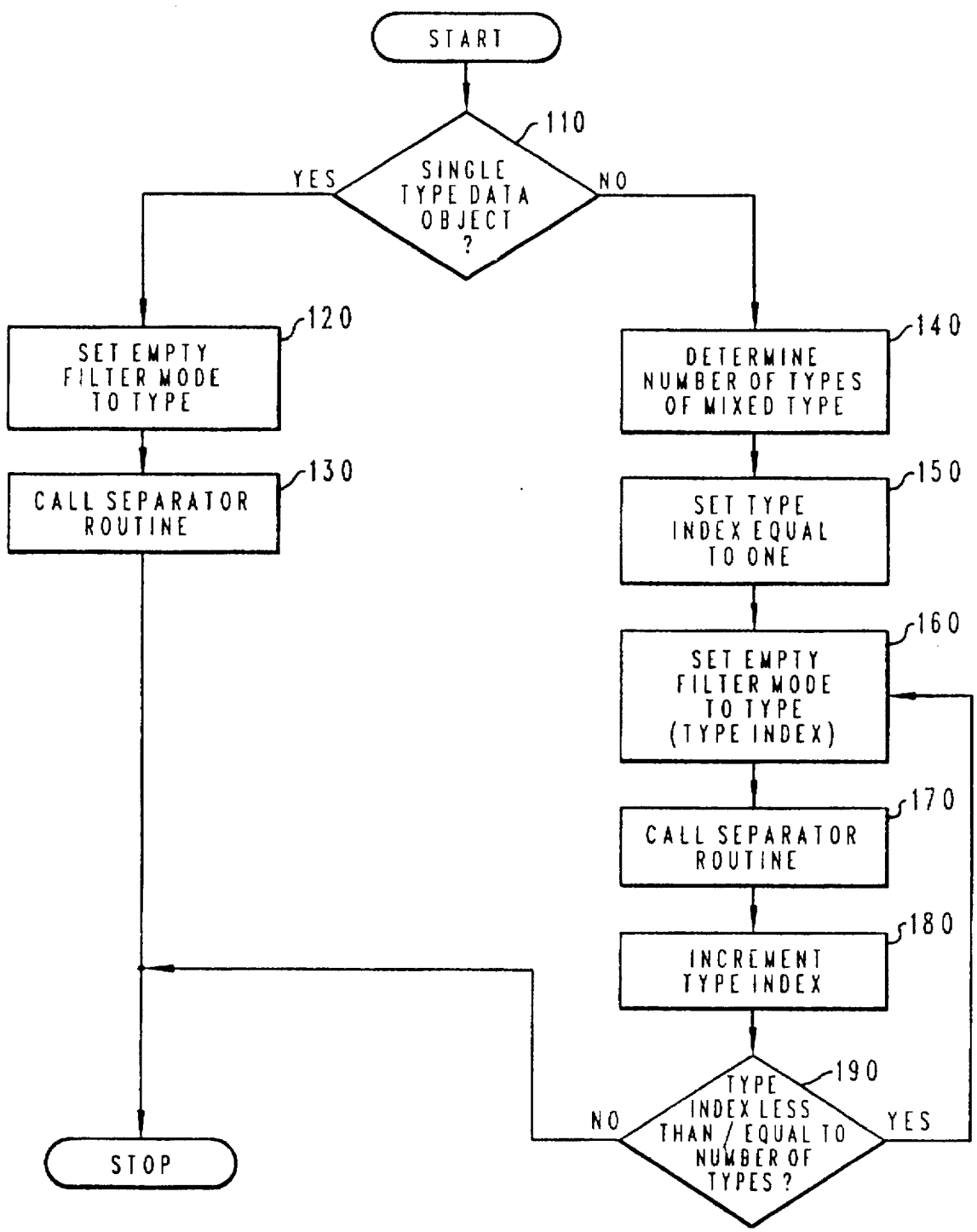
FIG. 1 is a flow chart illustrating the operations preferred in carrying out the present invention.

As shown in FIG. 1, which illustrates the operations preferred in carrying out the Main Program portion of the present invention, after the start of the program, decision block 110 determines if a data object is a single type data object. If the data object is a single type data object, then process block 120 sets an Empty Filter Mode equal to the data type of the single type data object. Thereafter, process block 130 calls the Separator Routine, passing the Empty Filter Mode and the data object. After control of the program returns from the Separator Routine to the Main Program, the program stops. Alternatively, the program may become dormant awaiting the next data object if it is an active process in a multi-process system.

Returning now to decision block 110, if a data object is not a single type data object, then the data object is a mixed type data object and process block 140 determines the number of data types of the mixed type data object. Thereafter, process block 150 initializes a Type Index by setting the Type Index equal to one. Thereafter, process block 160 sets the Empty Filter Mode equal to a data type of the mixed type data object as indexed by the Type Index. For example, during its first execution, process block 160 sets the Empty Filter Mode equal to the first data type of the mixed type data object. Thereafter, process block 170 calls the Separator Routine, passing the Empty Filter Mode and the data object. After control of the program returns from the Separator Routine to the Main Program, process block 180 increments the Type Index by one. Thereafter, decision block 190 determines if the Type Index is less than or equal to the number of data types of the mixed type data object. If the Type Index is not less than or equal to the number of data types of the mixed type data object, then the program stops. If the Type Index is less than or equal to the number of data types of the mixed type data object, then the program loops back to processing block 160 to process the next data type of the mixed type data object.

Figure 2:
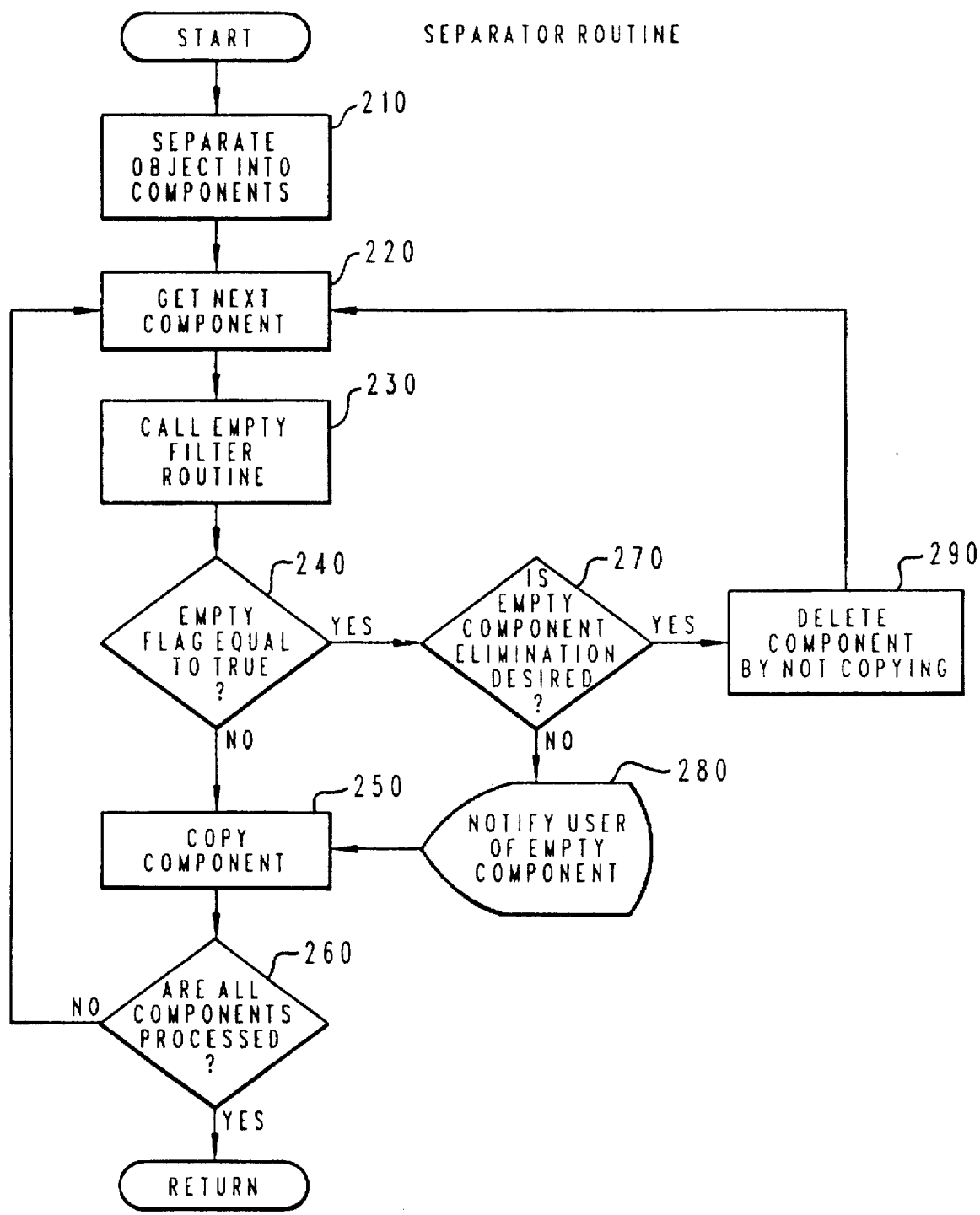
FIG. 2 is a flow chart illustrating the operations preferred in carrying out the Separator Routine portion of the present invention.

Referring next to FIG. 2, which illustrates the operations preferred in carrying out the Separator Routine portion of the present invention, after the start of the routine, process block 210 separates a data object into its components. For example, a text data object may be separated into pages, or a video data object may be separated into video frames.

Thereafter, process block 220 gets the next component of the data object. For example, during its first execution, process block 220 gets the first page of a text data object or the first frame of a video data object. Thereafter, process block 230 calls the Empty Filter Routine, passing the Empty Filter Mode and the data object component. After control of the program returns from the Empty Filter Routine to the Separator Routine, decision block 240, determines if an Empty Flag has been set equal to "True" by the Empty Filter Routine, indicating that the data object component is empty. If the Empty Flag has not been set equal to "True" by the Empty Filter Routine, indicating that the data object component is not empty, then process block 250 copies the component into a retention buffer. Thereafter, decision block 260 determines if all components of the data object have been processed. If all components of the data object have been processed, then the routine returns to the Main Program that called it. If all components of the data object have not been processed, then the routine loops back to process block 220 to process the next component.

Returning now to decision block 240. If the Empty Flag has been set equal to "True" by the Empty Filter Routine, indicating that the data object component is empty, then decision block 270 determines if elimination or deletion of the empty data object component is desired. If elimination or deletion of the empty data object component is not desired, then processing block 280 notifies the user of the existence of the empty data object component. Thereafter, the routine proceeds to process block 250 to copy the empty data object component into the retention buffer, as deletion was not desired.

Returning now to decision block 270, if elimination or deletion of the empty data object component is desired, then processing block 290 effectively deletes the empty data object component by not copying it into the retention buffer. Alternatively, if the Separator Routine did not use a retention buffer, processing block 290 may overwrite the empty data object component with a next component which is not empty, thus deleting the empty component. Thereafter, the routine loops back to processing block 220 to get the next data object component.

Figure 3:
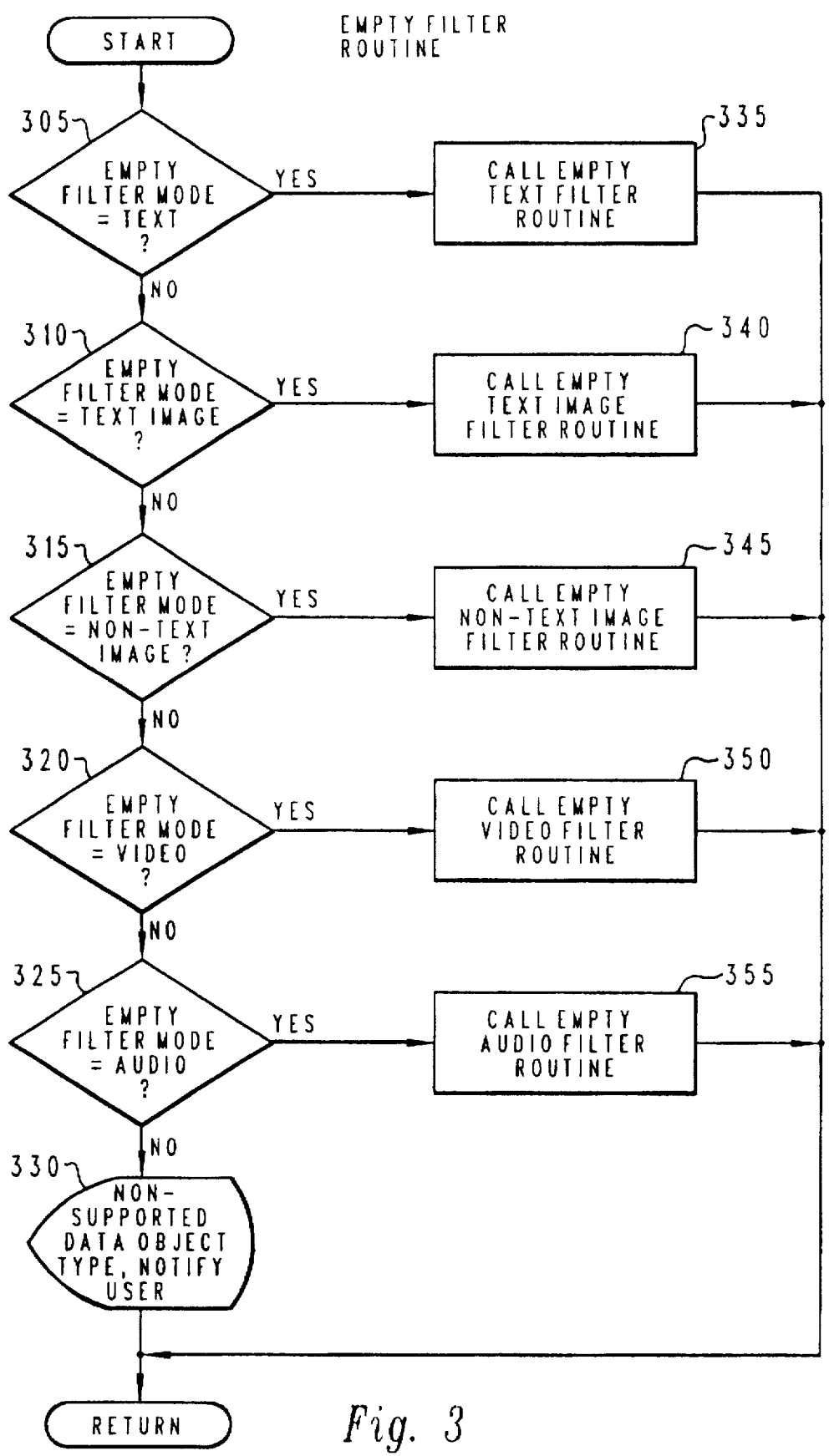
FIG. 3 is a flow chart illustrating the operations preferred in carrying out the Empty Filter Routine portion of the present invention.

Referring next to FIG. 3, which illustrates the operations preferred in carrying out the Empty Filter Routine portion of the present invention, after the start of the routine, decision block 305 determines if the Empty Filter Mode is set equal to "Text". If the Empty Filter Mode is set equal to "Text", then processing block 335 calls the Empty Text Filter Routine, passing the data object component. After control of the program returns from the Empty Text Filter Routine to the Empty Filter Routine, the Empty Filter Routine returns to the Separator Routine that called it, passing back the Empty Flag.

Returning now to decision block 305, if the Empty Filter Mode is not set equal to "Text", decision block 310 determines if the Empty Filter Mode is set equal to "Text Image". If the Empty Filter Mode is set equal to "Text Image", then processing block 340 calls the Empty Text Image Filter Routine, passing the data object component. After control of the program returns from the Empty Text Image Filter Routine to the Empty Filter Routine, the Empty Filter Routine returns to the Separator Routine that called it, passing back the Empty Flag.

Returning now to decision block 310, if the Empty Filter Mode is not set equal to "Text Image", decision block 315 determines if the Empty Filter Mode is set equal to "Non-Text Image". If the Empty Filter Mode is set equal to "Non-Text Image", then processing block 345 calls the Empty Non-Text Image Filter Routine, passing the data object component. After control of the program returns from the Empty Non-Text Image Filter Routine to the Empty Filter Routine, the Empty Filter Routine returns to the Separator Routine that called it, passing back the Empty Flag.

Returning now to decision block 315, if the Empty Filter Mode is not set equal to "Non-Text Image", decision block 320 determines if the Empty Filter Mode is set equal to "Video". If the Empty Filter Mode is set equal to "Video", then processing block 350 calls the Empty Video Filter Routine, passing the data object component. After control of the program returns from the Empty Video Filter Routine to the Empty Filter Routine, the Empty Filter Routine returns to the Separator Routine that called it, passing back the Empty Flag.

Returning now to decision block 320, if the Empty Filter Mode is not set equal to "Video", decision block 325 determines if the Empty Filter Mode is set equal to "Audio". If the Empty Filter Mode is set equal to "Audio", then processing block 355 calls the Empty Audio Filter Routine, passing the data object component. After control of the program returns from the Empty Audio Filter Routine to the Empty Filter Routine, the Empty Filter Routine returns to the Separator Routine that called it, passing back the Empty Flag.

Returning now to decision block 325, if the Empty Filter Mode is not set equal to "Audio", then processing block 330 notifies a user that the data object is a non-supported type. A non-supported type of data object is one for which the program does not provide automatic detection and processing of an empty multimedia data object. Processing block 330 also sets the Empty Flag equal to "False" so that the non-supported data object or its component is copied into the retention buffer. Alternatively, additional data object types and their corresponding filters may be added to the program so that they become supported types of data objects. Thereafter, the Empty Filter Routine returns to the Separator Routine that called it, passing back the Empty Flag.

Figure 4:
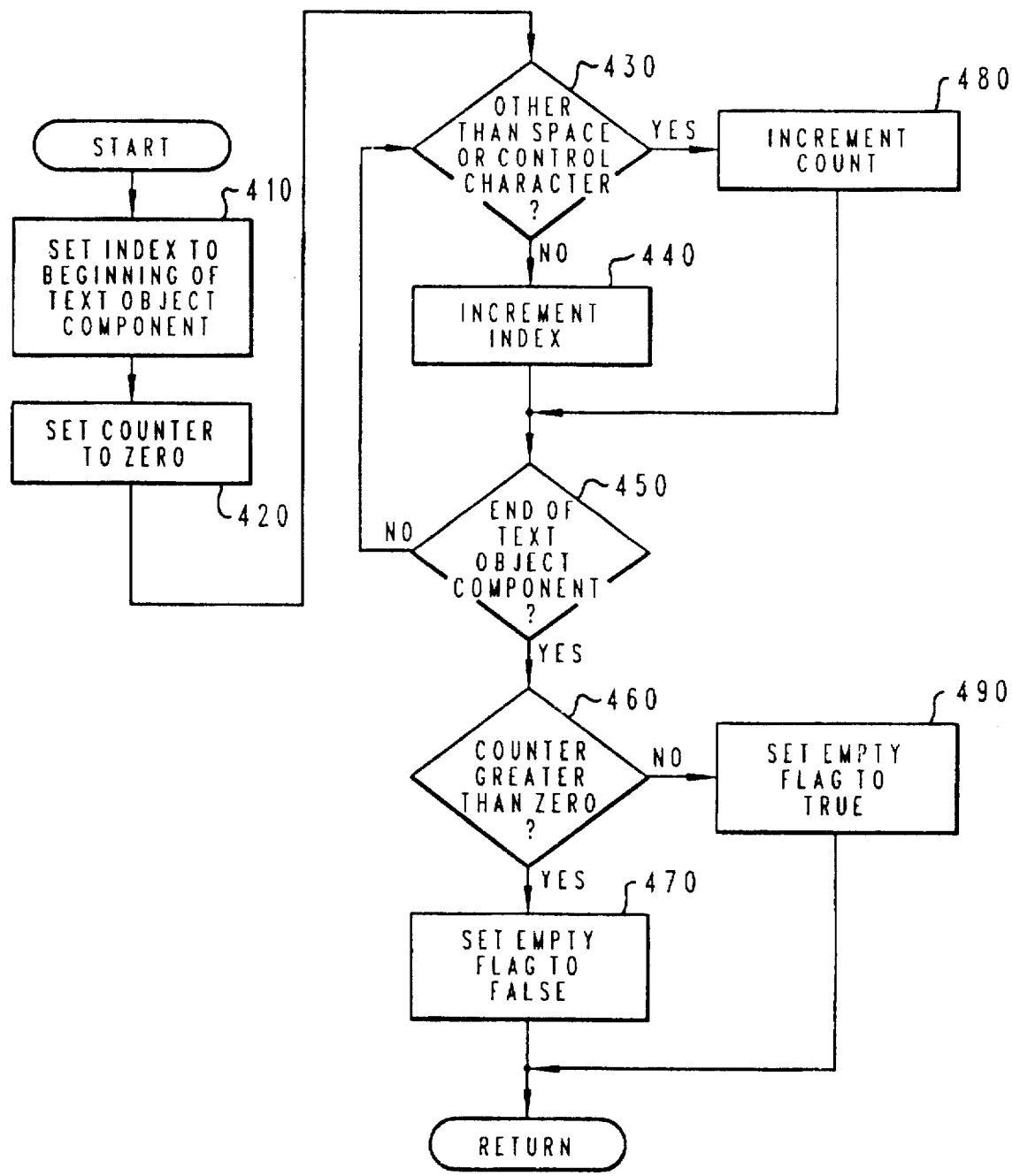
FIG. 4 is a flow chart illustrating the operations preferred in carrying out the Empty Text Filter Routine portion of the present invention.

Referring next to FIG. 4, which illustrates the operations preferred in carrying out the Empty Text Filter Routine portion of the present invention, after the start of the routine, processing block 410 sets an index to the beginning of a text type data object component. Thereafter, processing block 420 sets a counter equal to zero. Thereafter, decision block 430 determines if a character, at a position in the text data object indicated by the index, is other than a space or control character. If the character, at the position in the text data object indicated by the index, is a space or control character, then processing block 440 increments the index. Thereafter, decision block 450 determines if the end of the text data object component has been reached. If the end of the text data object component has been reached, then decision block 460 determines if the counter is greater than zero. If the counter is greater than zero, then processing block 470 sets the Empty Flag equal to "False". Thereafter, the Empty Text Filter Routine returns to the Empty Filter Routine that called it, passing back the Empty Flag.

Returning now to decision block 460, if the counter is not greater than zero, then processing block 490 sets the Empty Flag equal to "True". Thereafter, the Empty Text Filter Routine returns to the Empty Filter Routine that called it, passing back the Empty Flag.

Returning now to decision block 450, if the end of the text data object component has not been reached, then the routine loops back to decision block 430 to process the next character.

Returning now to decision block 430, if the character, at the position in the text data object indicated by the index, is other than a space or control character, then processing block 480 increments the counter. Thereafter, the routine proceeds to decision block 450 to determine if the end of the text object component has been reached.

Figure 5:
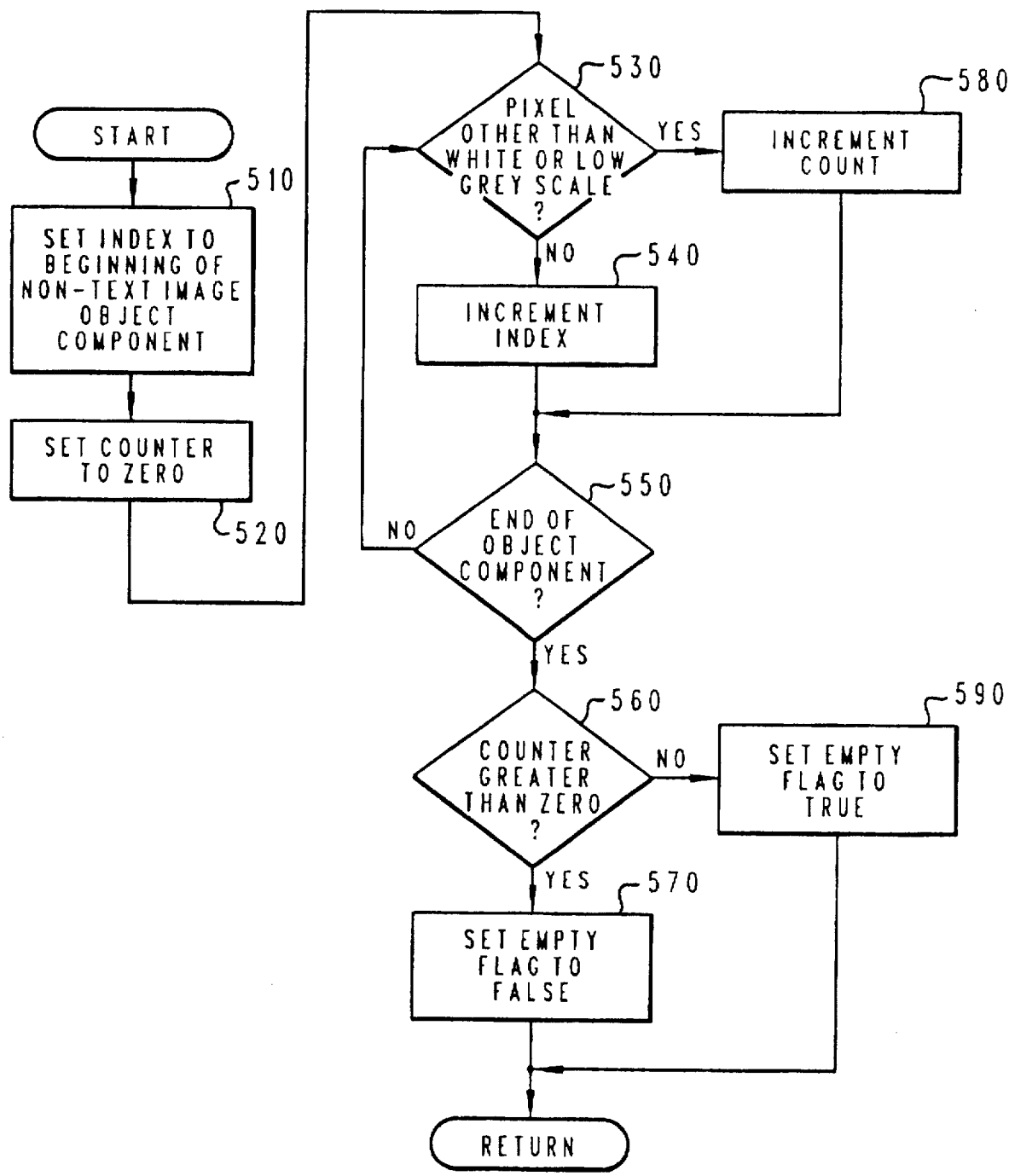
FIG. 5 is a flow chart illustrating the operations preferred in carrying out the Empty Non-Text Image Filter Routine portion of the present invention.

Referring next to FIG. 5, which illustrates the operations preferred in carrying out the Empty Non-Text Image Filter Routine portion of the present invention, after the start of the routine, processing block 510 sets an index to the beginning of a non-text image type data object component. Thereafter, processing block 520 sets a counter equal to zero. Thereafter, decision block 530 determines if a pixel, at a position in the non-text image data object indicated by the index, is other than white or a low-level grey scale. This determination may be accomplished by use of a print contrast ratio, which is well known in the art. A print contrast ratio is obtained by subtracting a reflectance at an inspection area from a maximum reflectance found within a specified distance from that area, and by dividing the result by the maximum reflectance. If the pixel, at the position in the non-text image data object indicated by the index, is white or a low-level grey scale, then processing block 540 increments the index. Thereafter, decision block 550 determines if the end of the non-text image data object component has been reached. If the end of the non-text image data object component has been reached, then decision block 560 determines if the counter is greater than zero. If the counter is greater than zero, then processing block 570 sets the Empty Flag equal to "False". Thereafter, the Empty Non-Text Image Filter Routine returns to the Empty Filter Routine that called it, passing back the Empty Flag.

Returning now to decision block 560, if the counter is not greater than zero, then processing block 590 sets the Empty Flag equal to "True". Thereafter, the Empty Non-Text Image Filter Routine returns to the Empty Filter Routine that called it, passing back the Empty Flag.

Returning now to decision block 550, if the end of the non-text image data object component has not been reached, then the routine loops back to decision block 530 to process the next pixel.

Returning now to decision block 530, if the pixel, at the position in the non-text image data object indicated by the index, is other than white or a low-level grey scale, then processing block 580 increments the counter. Thereafter, the routine proceeds to decision block 550 to determine if the end of the non-text image object component has been reached.

Figure 6:
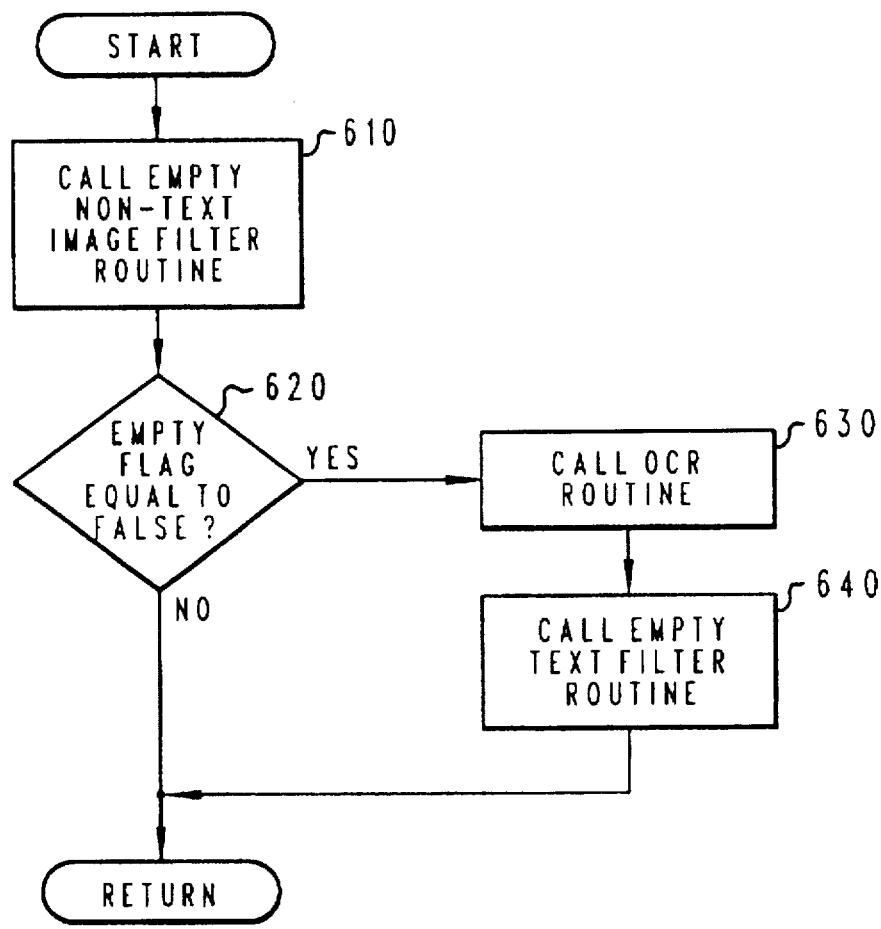
FIG. 6 is a flow chart illustrating the operations preferred in carrying out the Empty Text Image Filter Routine portion of the present invention.

Referring next to FIG. 6, which illustrates the operations preferred in carrying out the Empty Text Image Filter Routine portion of the present invention, after the start of the routine, processing block 610 calls the Empty Non-Text Image Filter Routine, passing the text image data object component. After control of the program returns from the Empty Non-Text Image Filter Routine to the Empty Text Image Filter Routine, decision block 620 determines if the Empty Flag returned by the Empty Non-Text Image Filter Routine is equal to "False". If the Empty Flag returned by the Empty Non-Text Image Filter Routine is not equal to "False", then the Empty Text Image Filter Routine returns to the Empty Filter Routine that called it, passing back the Empty Flag.

Returning now to decision block 620, if the Empty Flag returned by the Empty Non-Text Image Filter Routine is equal to "False", then processing block 630 calls an OCR (Optical Character Recognition) routine. The OCR routine converts the text image data object component into a text data object component and returns the text data object component to the Empty Text Image Filter Routine. Such OCR routines are well known to those skilled in the art. Alternatively, the OCR routine may be modified to recognize specific character strings or symbols indicating a blank text data object component. Examples of such text strings are "This page intentionally blank". The OCR routine may contain a table of such strings or symbols. Thereafter, processing block 640 calls the Empty Text Filter Routine, passing converted text data object component. After control of the program returns from the Empty Text Filter Routine to the Empty Text Image Filter Routine, the Empty Text Image Filter Routine returns to the Empty Filter Routine that called it, passing back the Empty Flag returned by the Empty Text Filter Routine.

The purpose of processing block 610 is to detect an empty text image data object component that does not require OCR processing to detect that it is empty, thus eliminating the unnecessary OCR processing in this situation. An example of such an empty text image data object component is a totally blank image. However, an empty text image data object component may be still be empty, yet not detected by processing block 610, due to smudges, image noise, or specific character strings indicating a blank text data object component. Thus the need for processing block 630.

An alternative embodiment of the Empty Text Image Filter Routine is the Empty Non-Text Image Filter Routine illustrated in FIG. 5. Such an alternative embodiment does not include the OCR processing.

Another alternative embodiment of the Empty Text Image Filter Routine is the two step sequence consisting of processing block 630 and processing block 640 as illustrated in FIG. 6. Such an alternative embodiment does not include the Empty Non-Text Image Filter call to eliminate unnecessary OCR processing.

Figure 7:
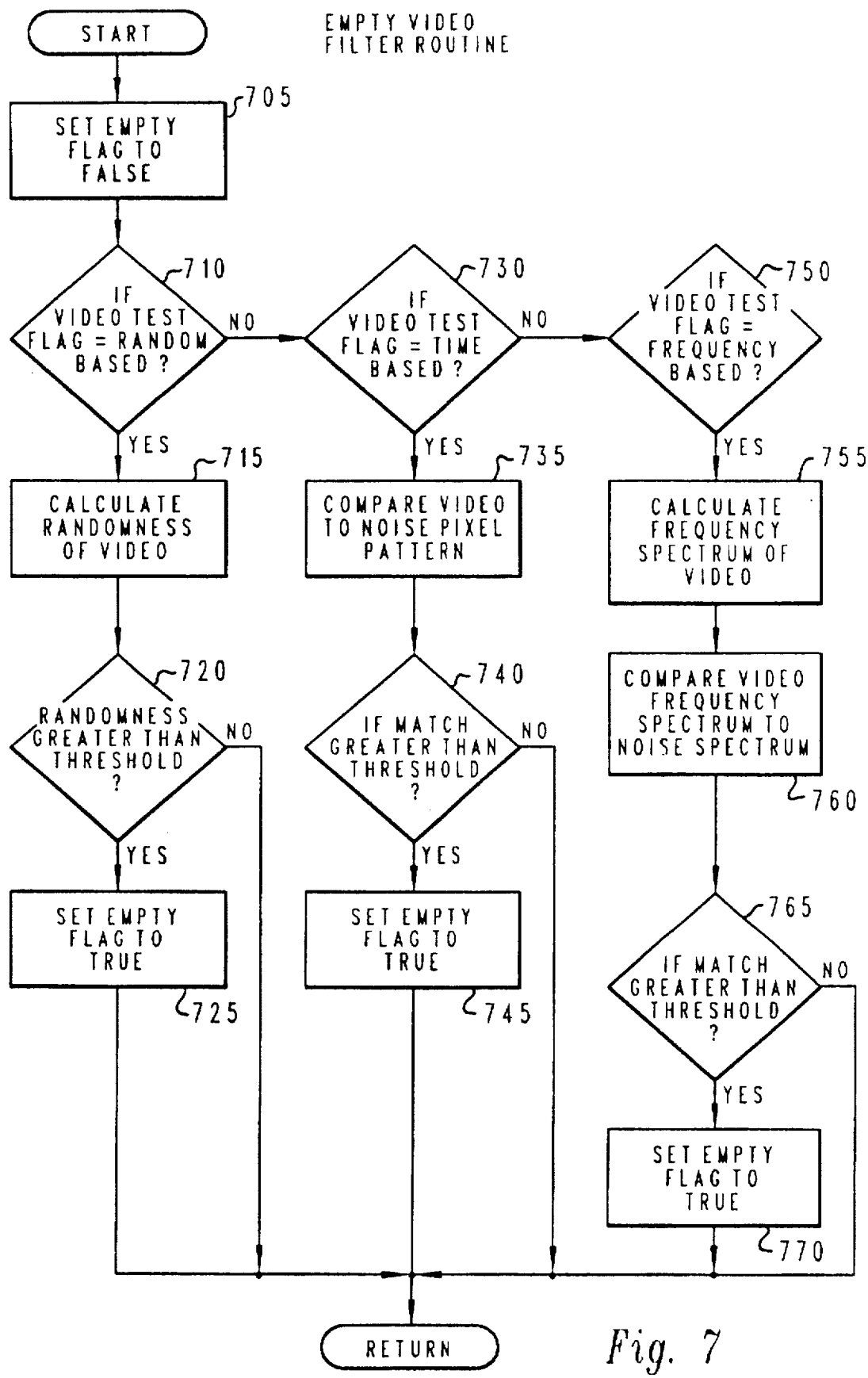
FIG. 7 is a flow chart illustrating the operations preferred in carrying out the Empty Video Filter Routine portion of the present invention.

Referring next to FIG. 7, which illustrates the operations preferred in carrying out the Empty Video Filter Routine portion of the present invention, after the start of the routine, process block 705 sets the Empty Flag equal to "False". Thereafter, decision block 710 determines if a Video Test Flag is equal to "Random Based Test". The Video Test Flag is a user configurable parameter which selects one of three types of tests to determine if a video data object component is empty. The three tests are a randomness test, a time domain noise pattern comparison test, and a frequency domain noise pattern comparison test. An alternative embodiment may include only one or two of these tests.

If the Video Test Flag is equal to "Random Based Test", then processing block 715 calculates the randomness of the video data object component. Methods and algorithms for calculating the randomness of an information signal such as a video signal are well known to those skilled in the art.

Thereafter, decision block 720 determines if the randomness, calculated by processing block 715, is greater than a randomness threshold. The randomness threshold is configurable by a user. If the randomness, calculated by processing block 715, is greater than a randomness threshold, then processing block 725 sets the Empty Flag equal to "True". Thereafter, the Empty Video Filter Routine returns to the Empty Filter Routine that called it, passing back the Empty Flag.

Returning now to decision block 720, if the randomness, calculated by processing block 715, is not greater than the randomness threshold, then the Empty Video Filter Routine returns to the Empty Filter Routine that called it, passing back the Empty Flag.

Returning now to decision block 710, if the Video Test Flag is not equal to "Random Based Test", then decision block 730 determines if the Video Test Flag is equal to "Time Based Test". If the Video Test Flag is equal to "Time Based Test", then processing block 735 calculates a comparison match, via pattern recognition, between the video data object component (video frame) and a known video noise pattern. Methods and algorithms for calculating such a pattern recognition comparison match are well known to those skilled in the art.

Thereafter, decision block 740 determines if the comparison match, calculated by processing block 735, is greater than a comparison match threshold. The comparison match threshold is configurable by a user. If the comparison match, calculated by processing block 735, is greater than a comparison match threshold, then processing block 745 sets the Empty Flag equal to "True". Thereafter, the Empty Video Filter Routine returns to the Empty Filter Routine that called it, passing back the Empty Flag.

Returning now to decision block 740, if the comparison match, calculated by processing block 735, is not greater than the comparison match threshold, then the Empty Video Filter Routine returns to the Empty Filter Routine that called it, passing back the Empty Flag.

Returning now to decision block 720, if the Video Test Flag is not equal to "Time Based Test", then decision block 750 determines if the Video Test Flag is equal to "Frequency Based Test". If the Video Test Flag is not equal to "Frequency Based Test", then a user is informed of a configuration error. If the Video Test Flag is equal to "Frequency Based Test", then processing block 755 calculates a frequency spectrum of the video data object component. Methods and algorithms for calculating such a frequency spectrum, such as a Fourier Transform, Fast Fourier Transform, or Winnograd Transform, are well known to those skilled in the art. Thereafter, processing block 760 calculates a comparison match, via pattern recognition, between the frequency spectrum of the video data object component (video frame) and a frequency spectrum of a known video noise pattern. Methods and algorithms for calculating such a pattern recognition comparison match are well known to those skilled in the art.

Thereafter, decision block 765 determines if the comparison match, calculated by processing block 760, is greater than a comparison match threshold. The comparison match threshold is configurable by a user. If the comparison match, calculated by processing block 765, is greater than a comparison match threshold, then processing block 770 sets the Empty Flag equal to "True". Thereafter, the Empty Video Filter Routine returns to the Empty Filter Routine that called it, passing back the Empty Flag.

Returning now to decision block 765, if the comparison match threshold, calculated by processing block 760, is not greater than the comparison match threshold, then the Empty Video Filter Routine returns to the Empty Filter Routine that called it, passing back the Empty Flag.

Figure 8:
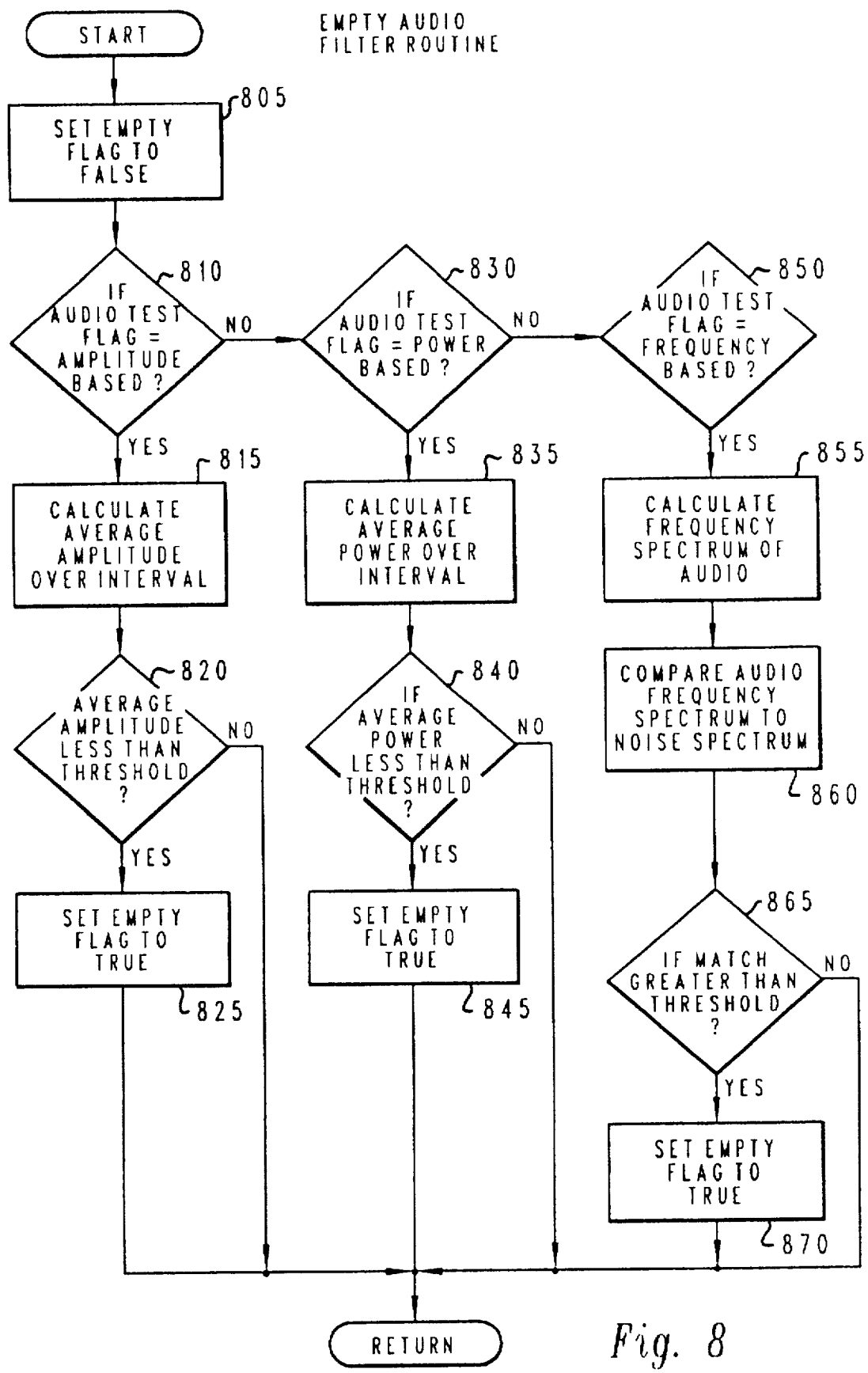
FIG. 8 is a flow chart illustrating the operations preferred in carrying out the Empty Audio Filter Routine portion of the present invention.

Referring next to FIG. 8, which illustrates the operations preferred in carrying out the Empty Audio Filter Routine portion of the present invention, after the start of the routine, process block 805 sets the Empty Flag equal to "False". Thereafter, decision block 810 determines if a Audio Test Flag is equal to "Amplitude Based Test". The Audio Test Flag is a user configurable parameter which selects one of three types of tests to determine if an audio data object component is empty. The three tests are a amplitude test, a power test, and a frequency domain noise pattern comparison test. An alternative embodiment may include only one or two of these tests.

If the Audio Test Flag is equal to "Amplitude Based Test", then processing block 815 calculates an average amplitude of the audio data object component. Alternatively, this average amplitude may be calculated over a user configurable time interval. Methods and algorithms for calculating the average amplitude of an audio signal are well known to those skilled in the art.

Thereafter, decision block 820 determines if the average amplitude, calculated by processing block 815, is less than an amplitude threshold. The amplitude threshold is configurable by a user. If the average amplitude, calculated by processing block 815, is less than the amplitude threshold, then processing block 825 sets the Empty Flag equal to "True". Thereafter, the Empty Audio Filter Routine returns to the Empty Filter Routine that called it, passing back the Empty Flag.

Returning now to decision block 820, if the average amplitude, calculated by processing block 815, is not less than the amplitude threshold, then the Empty Audio Filter Routine returns to the Empty Filter Routine that called it, passing back the Empty Flag.

Returning now to decision block 810, if the Audio Test Flag is not equal to "Amplitude Based Test", then decision block 830 determines if the Audio Test Flag is equal to "Power Based Test". If the Audio Test Flag is equal to "Power Based Test", then processing block 835 calculates an average power of the audio data object component. Alternatively, this average power may be calculated over a user configurable time interval. Methods and algorithms for calculating the average power of an audio signal are well known to those skilled in the art.

Thereafter, decision block 840 determines if the average power, calculated by processing block 835, is less than a power threshold. The power threshold is configurable by a user. If the average power, calculated by processing block 835, is less than the power threshold, then processing block 845 sets the Empty Flag equal to "True". Thereafter, the Empty Audio Filter Routine returns to the Empty Filter Routine that called it, passing back the Empty Flag.

Returning now to decision block 840, if the average power, calculated by processing block 835, is not less than the power threshold, then the Empty Audio Filter Routine returns to the Empty Filter Routine that called it, passing back the Empty Flag.

Returning now to decision block 820, if the Audio Test Flag is not equal to "Power Based Test", then decision block 850 determines if the Audio Test Flag is equal to "Frequency Based Test". If the Audio Test Flag is not equal to "Frequency Based Test", then a user is informed of a configuration error. If the Audio Test Flag is equal to "Frequency Based Test", then processing block 855 calculates a frequency spectrum of the audio data object component. Methods and algorithms for calculating a frequency spectrum, such as a Fourier Transform, Fast Fourier Transform, or Winnograd Transform, are well known to those skilled in the art. Thereafter, processing block 860 calculates a comparison match, via pattern recognition, between the frequency spectrum of the audio data object component (audio packet) and a frequency spectrum of a known audio noise pattern. Methods and algorithms for calculating such a pattern recognition comparison match are well known to those skilled in the art.

Thereafter, decision block 865 determines if the comparison match, calculated by processing block 860, is greater than a comparison match threshold. The comparison match threshold is configurable by a user. If the comparison match, calculated by processing block 865, is greater than a comparison match threshold, then processing block 870 sets the Empty Flag equal to "True". Thereafter, the Empty Audio Filter Routine returns to the Empty Filter Routine that called it, passing back the Empty Flag.

Returning now to decision block 865, if the comparison match threshold, calculated by processing block 860, is not greater than the comparison match threshold, then the Empty Audio Filter Routine returns to the Empty Filter Routine that called it, passing back the Empty Flag.

Figure 9:
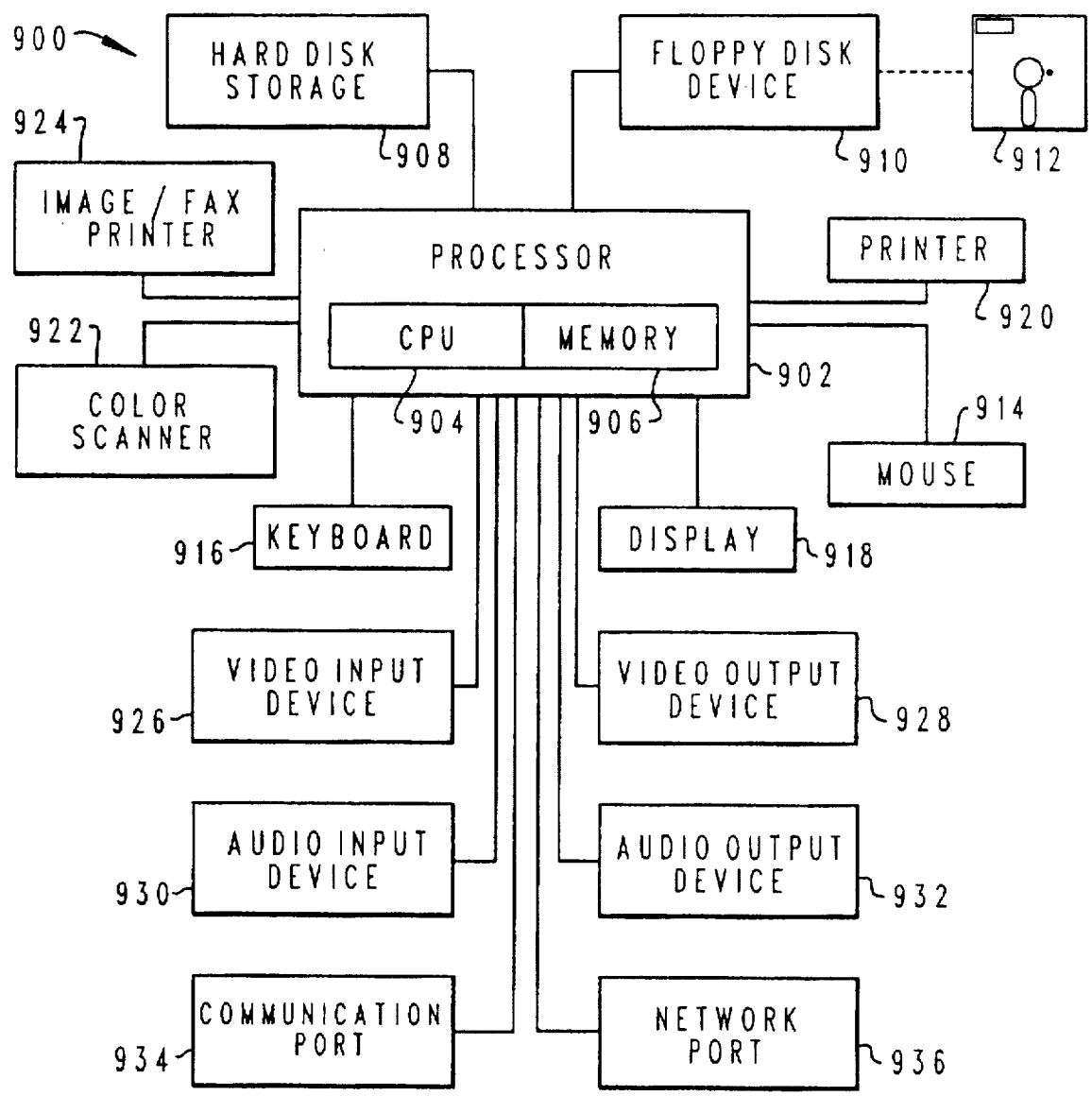
FIG. 9 is a block diagram of a computer system used in performing the method of the present invention and forming part of the apparatus of the present invention.

Referring now to FIG. 9, there is shown in block diagram form, a data processing system 900 according to the present invention. The data processing system 900 includes a processor 902, which includes a central processing unit (CPU) 904, and a memory 906. Additional memory, in the form of a hard disk file storage 908 and a floppy disk device 910, is connected to the processor 902. Floppy disk device 910 receives a diskette 912 which has computer program code recorded thereon that implements the present invention in the data processing system 900. The data processing system 900 includes user interface hardware, including a mouse 914 and a keyboard 916 for allowing user input to the processor 902 and a display 918 for presenting visual data to the user. The data processing system may also include a printer 920 for printing information. The data processing system 900 may also include image devices, including a scanner 924 for scanning images into the data processing system 900 and an image/fax printer 924 for printing images. The data processing system 900 may also include video devices, including a video input device 926 for entering video into the data processing system 900 and a video output device 928 for displaying video. The data processing system 900 may also include audio devices, including an audio input device 930 for entering audio into the data processing system 900 and an audio output device 932 for reproducing audio. The data processing system 900 may also include communication devices, including a communications port 934 for communicating with another system and a network port 932 for communicating with a network.

Although the present invention has been particularly shown and described with reference to a preferred embodiment, it will be understood of those skilled in the art that various changes in form and detail may be made without departing from the spirit and the scope of the invention.

What is claimed is:

1. A method of providing automatic detection and processing of an empty multimedia data object, comprising the steps of:

determining a data type of a multimedia data object; and
   detecting if the multimedia data object is an empty or partially empty multimedia data object based upon the data type, including
   separating the multimedia data object into components; and
   detecting if a component of the multimedia data object is empty or partially empty based upon the data type.

2. The method of claim 1, wherein the step of detecting if a component of the multimedia data object is empty or partially empty based upon the data type, further comprises the steps of:

selecting an information characteristic of the component of the multimedia data object, based on the data type;
   measuring the information characteristic of the component of the multimedia data object, to generate an information measurement; and comparing the information measurement to a threshold.

3. The method of claim 2, wherein the multimedia data object is a text type multimedia data object, and wherein the step of detecting if a component of the multimedia data object is empty or partially empty based upon the data type, further comprises the steps of:

counting characters, in the component of the text type multimedia data object, which are not a space and which are not a control character, to accumulate a character count; and comparing the character count to a threshold.

4. The method of claim 2, wherein the multimedia data object is a non-text image type multimedia data object, and wherein the step of detecting if a component of the multimedia data object is empty or partially empty based upon the data type, further comprises the steps of:

counting pixels, in the component of the non-text image type multimedia data object, which are not a white pixel and which are not a low grey scale pixel, to accumulate a pixel count; and comparing the pixel count to a threshold.

5. The method of claim 2, wherein the multimedia data object is a text image type multimedia data object, and wherein the step of detecting if a component of the multimedia data object is empty or partially empty based upon the data type, further comprises the steps of:

counting pixels, in the component of the text type image multimedia data object, which are not a white pixel and which are not a low grey scale pixel, to accumulate a pixel count; and comparing the pixel count to a threshold.

6. The method of claim 2, wherein the multimedia data object is a text image type multimedia data object, and wherein the step of detecting if a component of the multimedia data object is empty or partially empty based upon the data type, further comprises the steps of:

converting the component of the text image type multimedia data object into a text type multimedia data object component, by use of optical character recognition;

counting characters, in the text type multimedia data object, which are not a space and which are not a control character, to accumulate a character count; and comparing the character count to a threshold.

7. The method of claim 2, wherein the multimedia data object is a video type multimedia data object, and wherein the step of detecting if a component of the multimedia data object is empty or partially empty based upon the data type, further comprises the steps of:

calculating a randomness of the component of the video type multimedia data object; and comparing the randomness to a threshold.

8. The method of claim 2, wherein the multimedia data object is a video type multimedia data object, and wherein the step of detecting if a component of the multimedia data object is empty or partially empty based upon the data type, further comprises the steps of:

comparing the component of the video type multimedia data object to a noise pixel pattern, by use of pattern recognition to produce a match score; and comparing the match score to a threshold.

9. The method of claim 2, wherein the multimedia data object is a video type multimedia data object, and wherein the step of detecting if a component of the multimedia data object is empty or partially empty based upon the data type, further comprises the steps of:

calculating a frequency spectrum of the component of the video type multimedia data object;

comparing the frequency spectrum to a frequency spectrum of a video noise pixel pattern, by use of pattern recognition to produce a match score; and comparing the match score to a threshold.

10. The method of claim 2 wherein the multimedia data object is an audio type multimedia data object, and wherein the step of detecting if a component of the multimedia data object is empty or partially empty based upon the data type, further comprises the steps of:

calculating an average amplitude of the component of the audio type multimedia data object; and comparing the average amplitude to a threshold.

11. The method of claim 2, wherein the multimedia data object is an audio type multimedia data object, and wherein the step of detecting if a component of the multimedia data object is empty or partially empty based upon the data type, further comprises the steps of:

calculating an average power of the component of the audio type multimedia data object; and comparing the average power to a threshold.

12. The method of claim 2, wherein the multimedia data object is an audio type multimedia data object, and wherein the step of detecting if a component of the multimedia data object is empty or partially empty based upon the data type, further comprises the steps of:

calculating a frequency spectrum of the component of the audio type multimedia data object;

comparing the frequency spectrum to a frequency spectrum of an audio noise pattern, by use of pattern recognition to produce a match score; and comparing the match score to a threshold.

13. The method of claim 1, further comprising the step of:

selecting an appropriate processing of the multimedia data object if it is an empty multimedia data object.

14. The method of claim 13, wherein the step of selecting an appropriate processing of the multimedia data object if it is an empty multimedia data object, further comprises the step of:

deleting the multimedia data object.

15. The method of claim 13, wherein the step of selecting an appropriate processing of the multimedia data object if it is an empty multimedia data object, further comprises the step of:

inhibiting further processing of the multimedia data object.

16. The method of claim 13, wherein the step of selecting an appropriate processing of the multimedia data object if it is an empty multimedia data object, further comprises the step of:

notifying that the multimedia data object is empty.

17. The method of claim 1, further comprising the step of:

making available for other uses a space used by the multimedia data object if it is an empty multimedia data object.

18. An apparatus for providing automatic detection and processing of an empty multimedia data object, comprising:

means for determining a data type of a multimedia data object; and means for detecting if the multimedia data object is an empty multimedia data object based upon the data type, including means for separating the multimedia data object into components; and means for detecting if a component of the multimedia data object is empty or partially empty based upon the data type.

19. The method of claim 18, wherein the means for detecting if a component of the multimedia data object is empty or partially empty based upon the data type, further comprises:

means for selecting an information characteristic of the component of the multimedia data object, based on the data type;

means for measuring the information characteristic of the component of the multimedia data object, to generate an information measurement; and means for comparing the information measurement to a threshold.

20. The apparatus of claim 19, wherein the multimedia data object is a text type multimedia data object, and wherein the means for detecting if a component of the multimedia data object is empty or partially empty based upon the data type, further comprises:

means for counting characters, in the component of the text type multimedia data object, which are not a space and which are not a control character, to accumulate a character count; and means for comparing the character count to a threshold.

21. The apparatus of claim 19, wherein the multimedia data object is a non-text image type multimedia data object, and wherein the means for detecting if a component of the multimedia data object is empty or partially empty based upon the data type, further comprises:

means for counting pixels, in the component of the non-text image type multimedia data object, which are not a white pixel and which are not a low grey scale pixel, to accumulate a pixel count; and means for comparing the pixel count to a threshold.

22. The apparatus of claim 19, wherein the multimedia data object is a text image type multimedia data object, and wherein the means for detecting if a component of the multimedia data object is empty or partially empty based upon the data type, further comprises:

means for counting pixels, in the component of the text type image multimedia data object, which are not a white pixel and which are not a low grey scale pixel, to accumulate a pixel count; and means for comparing the pixel count to a threshold.

23. The apparatus of claim 19, wherein the multimedia data object is a text image type multimedia data object, and wherein the means for of detecting if a component of the multimedia data object is empty or partially empty based upon the data type, further comprises:

means for converting the component of the text image type multimedia data object into a text type multimedia data object component, by use of optical character recognition;

means for counting characters, in the text type multimedia data object, which are not a space and which are not a control character, to accumulate a character count; and means for comparing the character count to a threshold.

24. The apparatus of claim 19, wherein the multimedia data object is a video type multimedia data object, and wherein the means for detecting if a component of the multimedia data object is empty or partially empty based upon the data type, further comprises:

means for calculating a randomness of the component of the video type multimedia data object; and means for comparing the randomness to a threshold.

25. The apparatus of claim 19, wherein the multimedia data object is a video type multimedia data object, and wherein the means for detecting if a component of the multimedia data object is empty or partially empty based upon the data type, further comprises:

means for comparing the component of the video type multimedia data object to a noise pixel pattern, by use of pattern recognition to produce a match score; and means for comparing the match score to a threshold.

26. The apparatus of claim 19, wherein the multimedia data object is a video type multimedia data object, and wherein the means for detecting if a component of the multimedia data object is empty or partially empty based upon the data type, further comprises:

means for calculating a frequency spectrum of the component of the video type multimedia data object;

means for comparing the frequency spectrum to a frequency spectrum of a video noise pixel pattern, by use of pattern recognition to produce a match score; and means for comparing the match score to a threshold.

27. The apparatus of claim 19, wherein the multimedia data object is an audio type multimedia data object, and wherein the means for detecting if a component of the multimedia data object is empty or partially empty based upon the data type, further comprises:

means for calculating an average amplitude of the component for the audio type multimedia data object; and means for comparing the average amplitude to a threshold.

28. The apparatus of claim 19, wherein the multimedia data object is an audio type multimedia data object, and wherein the means for detecting if a component of the multimedia data object is empty or partially empty based upon the data type, further comprises:

means for calculating an average power of the component of the audio type multimedia data object; and means for comparing the average power to a threshold.

29. The apparatus of claim 19, wherein the multimedia data object is an audio type multimedia data object, and wherein the means for detecting if a component of the multimedia data object is empty or partially empty based upon the data type, further comprises:

means for calculating a frequency spectrum of the component of the audio type multimedia data object;

means for comparing the frequency spectrum to a frequency spectrum of an audio noise pattern, by use of pattern recognition to produce a match score; and means for comparing the match score to a threshold.

30. The apparatus of claim 18, further comprising:

means for selecting an appropriate processing of the multimedia data object if it is an empty multimedia data object.

31. The apparatus of claim 30, wherein the means for selecting an appropriate processing of the multimedia data object if it is an empty multimedia data object, further comprises:

means for deleting the multimedia data object.

32. The apparatus of claim 30, wherein the means for selecting an appropriate processing of the multimedia data object if it is an empty multimedia data object, further comprises:

means for inhibiting further processing of the multimedia data object.

33. The apparatus of claim 30, wherein the means for selecting an appropriate processing of the multimedia data object if it is an empty multimedia data object, further comprises:

means for notifying that the multimedia data object is empty.

34. The apparatus of claim 18, further comprising:
means for making available for other uses a space used by the multimedia data object if it is an empty multimedia data object.

35. A method of permitting automatic detection and processing of an empty multimedia data object, comprising the steps of:
determining a data type of a multimedia data object; and
detecting if the multimedia data object is an empty or partially empty multimedia data object based upon the data type, including
separating the multimedia data object into components; and
detecting if a component of the multimedia data object is empty or partially empty based upon the data type.

36. The method of claim 35, wherein the step of providing means for detecting if a component of the multimedia data object is empty or partially empty based upon the data type, further comprises:
selecting an information characteristic of the component of the multimedia data object, based on the data type;
measuring the information characteristic of the component of the multimedia data object, based on the data type;
measuring the information characteristic of the component of the multimedia data object, to generate an information measurement; and
comparing the information measurement to a threshold.

37. The method of claim 36, wherein the multimedia data object is a text type multimedia data object, and wherein the step of for detecting if a component of the multimedia data object is empty or partially empty based upon the data type, further comprises the steps of:
counting characters, in the component of the text type multimedia data object, which are not a space and which are not a control character, to accumulate a character count; and comparing the character count to a threshold.

38. The method of claim 36, wherein the multimedia data object is a non-text image type multimedia data object, and wherein the step of detecting if a component of the multimedia data object is empty or partially empty based upon the data type, further comprises the steps of:
counting pixels, in the component of the non-text image type multimedia data object, which are not a white pixel and which are not a low grey scale pixel, to accumulate a pixel count; and
comparing the pixel count to a threshold.

39. The method of claim 36, wherein the multimedia data object is a text image type multimedia data object, and wherein the step of detecting if a component of the multimedia data object is empty or partially empty based upon the data type, further comprises the steps of:
counting pixels, in the component of the text—image— type multimedia data object, which are not a white pixel and which are not a low grey scale pixel, to accumulate a pixel count; and
comparing the pixel count to a threshold.

40. The method of claim 36, wherein the multimedia data object is a text image type multimedia data object, and wherein the step of detecting if a component of the multimedia data object is empty or partially empty based upon the data type, further comprises the steps of:
converting the component of the text image type multimedia data object into a text type multimedia data object component, by use of optical character recognition;

counting characters, in the text—image—type multimedia data object, which are not a space and which are not a control character, to accumulate a character count; and
comparing the character count to a threshold.

41. The method of claim 36, wherein the multimedia data object is a video type multimedia data object, and wherein the step of detecting if a component of the multimedia data object is empty or partially empty based upon the data type, further comprises the steps of:
calculating a randomness of the component of the video type multimedia data object; and comparing the randomness to a threshold.

42. The method of claim 36, wherein the multimedia data object is a video type multimedia data object, and wherein the step of detecting if a component of the multimedia data object is empty or partially empty based upon the data type, further comprises the steps of:
comparing the component of the video type multimedia data object to a noise pixel pattern, by use of pattern recognition to produce a match score; and
comparing the match score to a threshold.

43. The method of claim 36, wherein the multimedia data object is a video type multimedia data object, and wherein the step of detecting if a component of the multimedia data object is empty or partially empty based upon the data type, further comprises the steps of:
calculating a frequency spectrum of the component of the video type multimedia data object;
comparing the frequency spectrum to a frequency spectrum of a video noise pixel pattern, by use of pattern recognition to produce a match score; and
comparing the match score to a threshold.

44. The method of claim 36, wherein the multimedia data object is an audio type multimedia data object, and wherein the step of detecting if a component of the multimedia data object is empty or partially empty based upon the data type, further comprises the steps of:
calculating an average amplitude of the component of the audio type multimedia data object; and
comparing the average amplitude to a threshold.

45. The method of claim 36, wherein the multimedia data object is an audio type multimedia data object, and wherein the step of detecting if a component of the multimedia data object is empty or partially empty based upon the data type, further comprises the steps of:
calculating an average power of the component of the audio type multimedia data object; and comparing the average power to a threshold.

46. The method of claim 36, wherein the multimedia data object is an audio type multimedia data object, and wherein the step of detecting if a component of the multimedia data object is empty or partially empty based upon the data type, further comprises the steps of:
calculating a frequency spectrum of the component of the audio type multimedia data object;
comparing the frequency spectrum to a frequency spectrum of an audio noise pattern, by use of pattern recognition to produce a match score; and
comparing the match score to a threshold.

47. The method of claim 35, further comprising the step of:
selecting an appropriate processing of the multimedia data object if it is an empty multimedia data object.

48. The method of claim 47, wherein the step of providing means for selecting an appropriate processing of the multimedia data object if it is an empty multimedia data object, further comprises the step of:

deleting the multimedia data object.

49. The method of claim 47, wherein the step of providing means for selecting an appropriate processing of the multimedia data object if it is an empty multimedia data object, further comprises the step of:

inhibiting further processing of the multimedia data object.

50. The method of claim 47, wherein the step of providing means for selecting an appropriate processing of the multimedia data object if it is an empty multimedia data object, further comprises the step of:

notifying that the multimedia data object is empty.

51. The method of claim 35 further comprising the step of:

making available for other uses a space used by the multimedia data object if it is an empty multimedia data object.

* * * * *

UNITED STATES PATENT AND TRADEMARK OFFICE
CERTIFICATE OF CORRECTION

PATENT NO. : 5,758,049
DATED : May 26, 1998
INVENTOR(S) : Johnson et al.

It is certified that error appears in the above-identified patent and that said Letters Patent is hereby corrected as shown below:

Column 17, lines 22-24: delete "measuring the information characteristic of the component of the multimedia data object, based on the data type;"

Signed and Sealed this

Twenty-fifth Day of August, 1998

Attest:

BRUCE LEHMAN

*Attesting Officer*   *Commissioner of Patents and Trademarks*